(12) United States Patent
Chang et al.

(10) Patent No.: US 10,534,422 B2
(45) Date of Patent: *Jan. 14, 2020

(54) DATA COMPRESSION SYSTEM FOR LIQUID CRYSTAL DISPLAY AND RELATED POWER SAVING METHOD

(71) Applicant: NOVATEK Microelectronics Corp., Hsin-Chu (TW)

(72) Inventors: Kuei-Chung Chang, Hsinchu County (TW); Feng-Jung Kuo, Hsinchu County (TW); Hsi-Chi Ho, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/021,041

(22) Filed: Jun. 28, 2018

(65) Prior Publication Data

US 2018/0314315 A1 Nov. 1, 2018

Related U.S. Application Data

(63) Continuation-in-part of application No. 15/635,185, filed on Jun. 27, 2017, now Pat. No. 10,042,411,
(Continued)

(30) Foreign Application Priority Data

Aug. 9, 2013 (TW) .............................. 102128708 A

(51) Int. Cl.
G06F 1/3234 (2019.01)
G06T 1/60 (2006.01)
G09G 3/36 (2006.01)

(52) U.S. Cl.
CPC .............. G06F 1/3265 (2013.01); G06T 1/60 (2013.01); G09G 3/36 (2013.01);
(Continued)

(58) Field of Classification Search
CPC ... G06F 1/3265; G06T 1/60; G09G 2330/021; G09G 2340/02; G09G 2360/02
(Continued)

(56) References Cited

U.S. PATENT DOCUMENTS 6,145,069 A 11/2000 Dye
6,611,919 B1 8/2003 Matsuya
(Continued)

FOREIGN PATENT DOCUMENTS

CN 101154373 A 4/2008
CN 101727839 A 6/2010
(Continued)

*Primary Examiner* — Jacinta M Crawford
(74) *Attorney, Agent, or Firm* — Winston Hsu

(57) ABSTRACT

A drive circuit applicable to a display device includes a first signal path and a second signal path. The first signal path, configured to receive and transmit image data, includes a compression unit configured to perform a compression procedure on the image data to generate compression data; a storage unit configured to store the compression data; and a de-compression unit configured to perform a de-compression procedure on the compression data to recover the image data. The second signal path is configured to transmit the image data to the storage unit so as to bypass the compression unit, and transmit the image data received from the storage unit to a display unit so as to bypass the de-compression unit when the image data is not transmitted by the first signal path. The received image data is passed through the first signal path or the second signal path depending upon its characteristics.

63 Claims, 9 Drawing Sheets

Related U.S. Application Data which is a continuation of application No. 14/078,490, filed on Nov. 12, 2013, now Pat. No. 9,727,120.

(52) U.S. Cl.
CPC ... *G09G 2330/021* (2013.01); *G09G 2340/02* (2013.01); *G09G 2360/02* (2013.01); *Y02D 10/153* (2018.01)

(58) Field of Classification Search
USPC .......................................................... 345/555
See application file for complete search history.

(56) References Cited

U.S. PATENT DOCUMENTS

| | | | |
|---|---|---|---|
| 6,704,022 B1* | 3/2004 | Aleksic | G06T 1/20 345/519 |
| 2007/0110155 A1 | 5/2007 | Sung | |
| 2007/0265031 A1 | 11/2007 | Koizumi | |
| 2008/0158375 A1 | 7/2008 | Kakkori | |
| 2009/0087114 A1 | 4/2009 | Porter | |
| 2009/0092325 A1 | 4/2009 | Brown Elliott | |
| 2009/0213396 A1* | 8/2009 | Togami | H04N 1/3875 358/1.9 |
| 2010/0053183 A1 | 3/2010 | Park | |
| 2011/0234608 A1 | 9/2011 | Funada | |
| 2012/0062554 A1 | 3/2012 | Ueno | |

FOREIGN PATENT DOCUMENTS

| | | |
|---|---|---|
| CN | 101924950 A | 12/2010 |
| JP | 2011-203290 A | 10/2011 |
| TW | I227455 | 2/2005 |
| TW | I240220 | 9/2005 |
| TW | 201008285 | 2/2010 |

* cited by examiner

DATA COMPRESSION SYSTEM FOR LIQUID CRYSTAL DISPLAY AND RELATED POWER SAVING METHOD

CROSS REFERENCE TO RELATED APPLICATIONS

This application is a continuation-in-part application of U.S. application Ser. No. 15/635,185, filed on Jun. 27, 2017, which is a continuation application of U.S. application Ser. No. 14/078,490, filed on Nov. 12, 2013. The contents of the applications are incorporated herein by reference.

BACKGROUND OF THE INVENTION

1. Field of the Invention

The present invention relates to a data compression system for a liquid crystal display (LCD), and more particularly, to a data compression system and related power saving method capable of selecting a data transmission path according to an operation mode.

2. Description of the Prior Art

The liquid crystal display (LCD), which has advantages of thin appearance, low power saving and low radiation, etc. has widely been applied in various electronic products such as a computer screen, mobile telephone, personal digital assistant (PDA), flat television, and other communication/entertainment equipment. The principle of LCD is to vary the arrangement of liquid crystal molecules in a liquid crystal layer by varying the voltage difference between two terminals of the liquid crystal layer. The transparency of the liquid crystal layer may change accordingly, which is further incorporated with the light source provided by a backlight module to display images.

The LCD includes a drive chip. After data is transmitted from a host to the drive chip, the data may be compressed by a compression circuit and stored in a compression memory. The drive chip then utilizes a de-compression circuit to transmit the data to the display area. When the drive chip is operated in some particular modes, information related to complete color gamut may not be required. Thus, compressing the information data of complete color gamut via the compression circuit may generate unnecessary power consumption.

SUMMARY OF THE INVENTION

It is therefore an objective of the present invention to provide a data compression system for a liquid crystal display (LCD), in order to reduce power consumption of the LCD.

The present invention discloses a drive circuit applicable to a display device. The drive circuit comprises a first signal path and a second signal path. The first signal path, configured to receive image data and transmit the image data, comprises a compression unit, a storage unit and a de-compression unit. The compression unit is configured to perform a compression procedure on the image data to generate compression data. The storage unit is configured to be coupled to the compression unit and configured to store the compression data. The de-compression unit, coupled to the storage unit, is configured to receive the compression data and perform a de-compression procedure on the compression data to recover the image data. The second signal path is configured to transmit the image data to the storage unit so as to bypass the compression unit and transmit the image data received from the storage unit to a display unit so as to bypass the de-compression unit when the image data is not transmitted by the first signal path. The received image data is passed through one of the first signal path and the second signal path depending upon characteristics of the received image data.

The present invention further discloses a drive circuit applicable to a display device. The drive circuit comprises a first signal path and a second signal path. The first signal path, configured to receive image data and transmit the image data, comprises a compression unit, a storage unit and a de-compression unit. The compression unit is configured to perform a compression procedure on the image data to generate compression data. The storage unit is configured to be coupled to the compression unit and configured to store the compression data. The de-compression unit, coupled to the storage unit, is configured to receive the compression data and perform a de-compression procedure on the compression data to recover the image data. The second signal path is configured to transmit the image data to the storage unit so as to bypass the compression circuit and transmit the image data received from the storage unit to a display unit so as to bypass the de-compression circuit when the image data is not transmitted by the first signal path. The drive circuit is further configured to receive from a host indicating a first operation mode or a second operation mode, and responsively pass the image data through the first signal path in the first operation mode and pass the image data through the second signal path in the second operation mode.

The present invention further discloses a drive circuit applicable to a display device. The drive circuit comprises a first signal path and a second signal path. The first signal path, configured to receive image data and transmit the image data, comprises a compression unit, a storage unit and a de-compression unit. The compression unit is configured to perform a compression procedure on the image data to generate compression data. The storage unit is configured to be coupled to the compression unit and configured to store the compression data. The de-compression unit, coupled to the storage unit, is configured to receive the compression data and perform a de-compression procedure on the compression data to recover the image data. The second signal path is configured to transmit the image data to the storage unit so as not to perform the compression procedure and transmit the image data received from the storage unit to a display unit so as not to perform the de-compression procedure when the image data is not transmitted by the first signal path. The drive circuit is further configured to determine whether to operate in a first operation mode or in a second operation mode according to characteristics of the received image data, and pass the image data through the first signal path in the first operation mode and pass the image data through the second signal path in the second operation mode.

The present invention further discloses a data compression system applicable to a display device. The data compression system comprises a host and a drive circuit. The host is configured to output image data. The drive circuit, coupled to the host, comprises a compression unit, a storage unit and a de-compression unit. The compression unit is configured to perform a compression procedure on the image data to generate compression data. The storage unit is configured to be coupled to the compression unit and configured to store the compression data. The de-compression unit, coupled to the storage unit, is configured to receive the compression data and perform a de-compression procedure on the compression data to recover the image data. The second signal path is configured to transmit the image data to the storage unit so as to bypass the compression unit and transmit the image data received from the storage unit to a display unit so as to bypass the de-compression unit when the image data is not transmitted by the first signal path. The received image data is passed through one of the first signal path and the second signal path depending upon characteristics of the received image data.

The present invention further discloses a data compression system, which comprises a host and a drive circuit. The host is configured to output image data. The drive circuit, coupled to the host to receive the image data, comprises a first signal path and a second signal path. The first signal path, configured to receive the image data and transmit the image data, comprises a compression unit, a storage unit and a de-compression unit. The compression unit is configured to perform a compression procedure on the image data to generate compression data. The storage unit is configured to be coupled to the compression unit and configured to store the compression data. The de-compression unit, coupled to the storage unit, is configured to receive the compression data and perform a de-compression procedure on the compression data to recover the image data. The second signal path is configured to transmit the image data to the storage unit so as to bypass the compression unit and transmit the image data received from the storage unit to a display unit so as to bypass the de-compression unit when the image data is not transmitted by the first signal path. The drive circuit is further configured to receive from the host indicating a first operation mode or a second operation mode, and responsively pass the image data through the first signal path in the first operation mode and pass the image data through the second signal path in the second operation mode.

The present invention further discloses a data compression system, which comprises a host and a drive circuit. The host is configured to output image data. The drive circuit, coupled to the host to receive the image data, comprises a first signal path and a second signal path. The first signal path, configured to receive the image data and transmit the image data, comprises a compression unit, a storage unit and a de-compression unit. The compression unit is configured to perform a compression procedure on the image data to generate compression data. The storage unit is configured to be coupled to the compression unit and configured to store the compression data. The de-compression unit, coupled to the storage unit, is configured to receive the compression data and perform a de-compression procedure on the compression data to recover the image data. The second signal path is configured to transmit the image data to the storage unit so as not to perform the compression procedure and transmit the image data received from the storage unit to a display unit so as not to perform the de-compression procedure when the image data is not transmitted by the first signal path. The drive circuit is further configured to determine whether to operate in a first operation mode or in a second operation mode according to characteristics of the image data received from the host, and pass the image data through the first signal path in the first operation mode and pass the image data through the second signal path in the second operation mode.

The present invention further discloses a power saving method, which comprises passing image data through a first signal path and passing image data through a second signal path. The first signal path comprises a compression unit, a storage unit and a de-compression unit. The compression unit is configured to perform a compression procedure on image data to generate compression data. The storage unit, coupled to the compression unit, is configured to store the compression data. The de-compression unit, coupled to the storage unit, is configured to receive the compression data and perform a de-compression procedure on the compression data to recover the image data. The second signal path is configured to receive image data, transmit the image data to the storage unit so as to bypass the compression unit, and transmit the image data received from the storage unit to a display unit so as to bypass the de-compression unit. The received image data is passed through one of the first signal path and the second signal path depending upon characteristics of the received image data.

The present invention further discloses a power saving method, which comprises passing image data through a first signal path, passing image data through a second signal path, and receiving an indication signal from a host indicating a first operation mode or a second operation mode, and responsively passing the image data through the first signal path in the first operation mode and passing the image data through the second signal path in the second operation mode. The first signal path, configured to receive image data and transmit the image data, comprises a compression unit, a storage unit and a de-compression unit. The compression unit is configured to perform a compression procedure on the image data to generate compression data. The storage unit is configured to be coupled to the compression unit and configured to store the compression data. The de-compression unit, coupled to the storage unit, is configured to receive the compression data and perform a de-compression procedure on the compression data to recover the image data. The second signal path is configured to transmit the image data to the storage unit so as to bypass the compression unit and transmit the image data received from the storage unit to a display unit so as to bypass the de-compression unit when the image data is not transmitted by the first signal path.

The present invention further discloses a power saving method, which comprises receiving image data from an input configured to be coupled to a host, passing image data through a first signal path, passing image data through a second signal path, and determining whether to operate in a first operation mode or in a second operation mode according to characteristics of the received image data, and responsively passing the image data through the first signal path in the first operation mode and passing the image data through the second signal path in the second operation mode. The first signal path, configured to receive image data and transmit the image data, comprises a compression unit, a storage unit and a de-compression unit. The compression unit is configured to perform a compression procedure on the image data to generate compression data. The storage unit is configured to be coupled to the compression unit and configured to store the compression data. The de-compression unit, coupled to the storage unit, is configured to receive the compression data and perform a de-compression procedure on the compression data to recover the image data. The second signal path is configured to transmit the image data to the storage unit so as not to perform the compression procedure and transmit the image data received from the storage unit to a display unit so as not to perform the de-compression procedure when the image data is not transmitted by the first signal path.

The present invention further discloses a power saving method for a display device. The power saving method comprises performing a first signal processing procedure; and performing a second signal processing procedure when the first signal processing procedure is not performed. The first signal processing procedure comprises performing a first compression procedure on image data to generate compression data; storing the compression data in a storage unit; and performing a first de-compression procedure on the compression data to recover the image data having been compressed with a first compression ratio. The second signal processing procedure comprises processing the image data for storing in the storage unit without performing the first compression procedure; and processing the image data received from the storage unit for transmitting to a display unit without performing the first de-compression procedure. The first signal processing procedure or the second signal processing procedure is performed on the received image data depending upon characteristics of the received image data.

The present invention further discloses a power saving method for a display device. The power saving method comprises performing a first signal processing procedure; performing a second signal processing procedure when the first signal processing procedure is not performed; and receiving an indication signal from a host indicating a first operation mode or a second operation mode, and responsively performing the first signal processing procedure in the first operation mode and performing the second signal processing procedure in the second operation mode. The first signal processing procedure comprises performing a first compression procedure on image data to generate compression data; storing the compression data in a storage unit; and performing a first de-compression procedure on the compression data to recover the image data having been compressed with a first compression ratio. The second signal processing procedure comprises processing the image data for storing in the storage unit without performing the first compression procedure; and processing the image data received from the storage unit for transmitting to a display unit without performing the first de-compression procedure.

The present invention further discloses a power saving method for a display device. The power saving method comprises performing a first signal processing procedure; performing a second signal processing procedure when the first signal processing procedure is not performed; and determining whether to operate in a first operation mode or in a second operation mode according to characteristics of the received image data, and responsively performing the first signal processing procedure in the first operation mode and performing the second signal processing procedure in the second operation mode. The first signal processing procedure comprises performing a first compression procedure on image data to generate compression data; storing the compression data in a storage unit; and performing a first de-compression procedure on the compression data to recover the image data having been compressed with a first compression ratio. The second signal processing procedure comprises processing the image data for storing in the storage unit without performing the first compression procedure; and processing the image data received from the storage unit for transmitting to a display unit without performing the first de-compression procedure.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2A and FIG. 2B are schematic diagrams of a data format according to an embodiment of the present invention.

FIG. 2C is a schematic diagram of compressed data according to an embodiment of the present invention.

DETAILED DESCRIPTION

Figure 1:
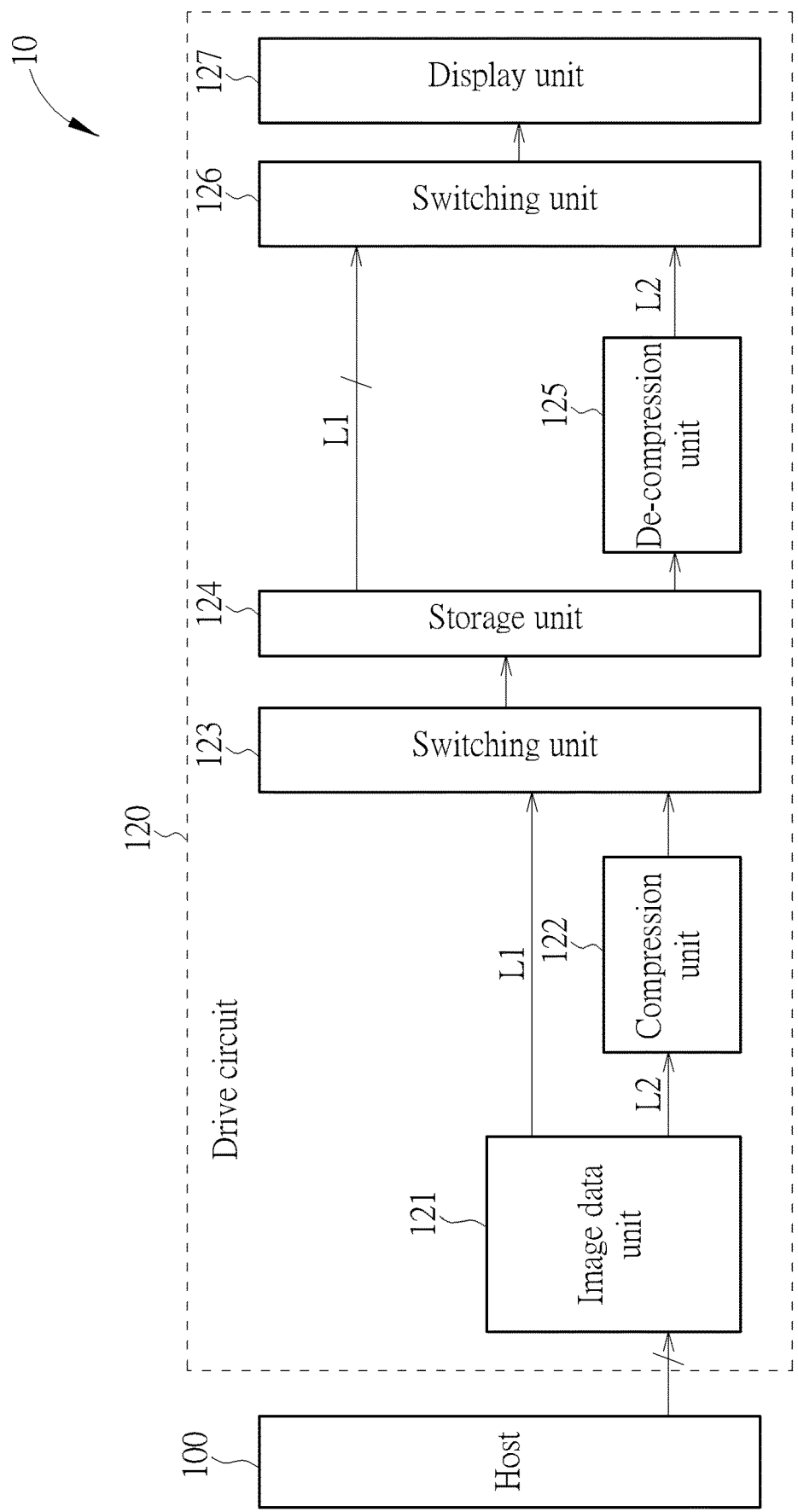
FIG. 1 is a schematic diagram of a data compression system according to an embodiment of the present invention.

Please refer to FIG. 1, which is a schematic diagram of a data compression system 10 according to an embodiment of the present invention. The data compression system 10 is utilized for a liquid crystal display (LCD). The data compression system 10 includes a host 100 and a drive circuit 120. The host 100 is utilized for outputting image data Img_D in a data format frmt1 or a data format frmt2 according to an operation mode of the LCD. Preferably, the drive circuit 120 may be realized by a drive integrated circuit (IC). The drive circuit 120 includes an image data unit 121, a compression unit 122, switching units 123 and 126, a storage unit 124, a de-compression unit 125, a display unit 127, a bypass path L1 and a complete data path L2. The switching units 123 and 126 are utilized for switching between the bypass path L1 and the complete data path L2. The compression unit 122 is utilized for receiving the image data Img_D and performing a compression procedure on the image data Img_D according to the operation mode to generate a compression data Cmprs_D. The storage unit 124, coupled to the compression unit 122 and the host 100, is utilized for storing the compression data Cmprs_D and the image data Img_D. The storage unit 124 may preferably be a static random access memory (SRAM). The de-compression unit 125, coupled to the storage unit 124, is utilized for receiving the compression data Cmprs_D and performing a de-compression procedure on the compression data Cmprs_D to recover the image data Img_D according to the operation mode. The display unit 127 is utilized for displaying the image data Img_D.

When the operation mode is a particular mode, the host 100 outputs the image data Img_D in a data format frmt1, and transmits the image data Img_D in the data format frmt1 via the bypass path L1. When the operation mode is a general mode, the host 100 outputs the image data Img_D in a data format frmt2, and transmits the image data Img_D in the data format frmt2 via the complete data path L2. Preferably, the image data in the data format frmt1 has fewer bit numbers than the image data in the data format frmt2. In addition, the particular mode includes a color gamut reduction mode, a partial area display mode and a scaleup display mode. In the particular mode, the full information of the color gamut is not necessary. For example, in the color gamut reduction mode, RGB color model may be reduced from 24 bits to 3 bits; in the partial area display mode, when the LCD is switched from 480×800 full screen display to 100×100 partial screen display, other area on the screen that does not display images may be replaced by a single color;

in the scale up display mode, when the LCD is switched from 480×800 full screen display to 240×400 scale up display, only half data is required to fulfill 480×800 full screen display. Therefore, in the particular mode, the host 100 may output the image data Img_D in the data format frmt1 with smaller data quantity, reduce the data quantity required to be stored in the storage unit 124, and transmit the image data Img_D to the display unit 127 via the bypass path L1 without undergoing the compression procedure and de-compression procedure. As a result, unnecessary power consumption will be prevented.

Figures 2A, 2B, 2C:
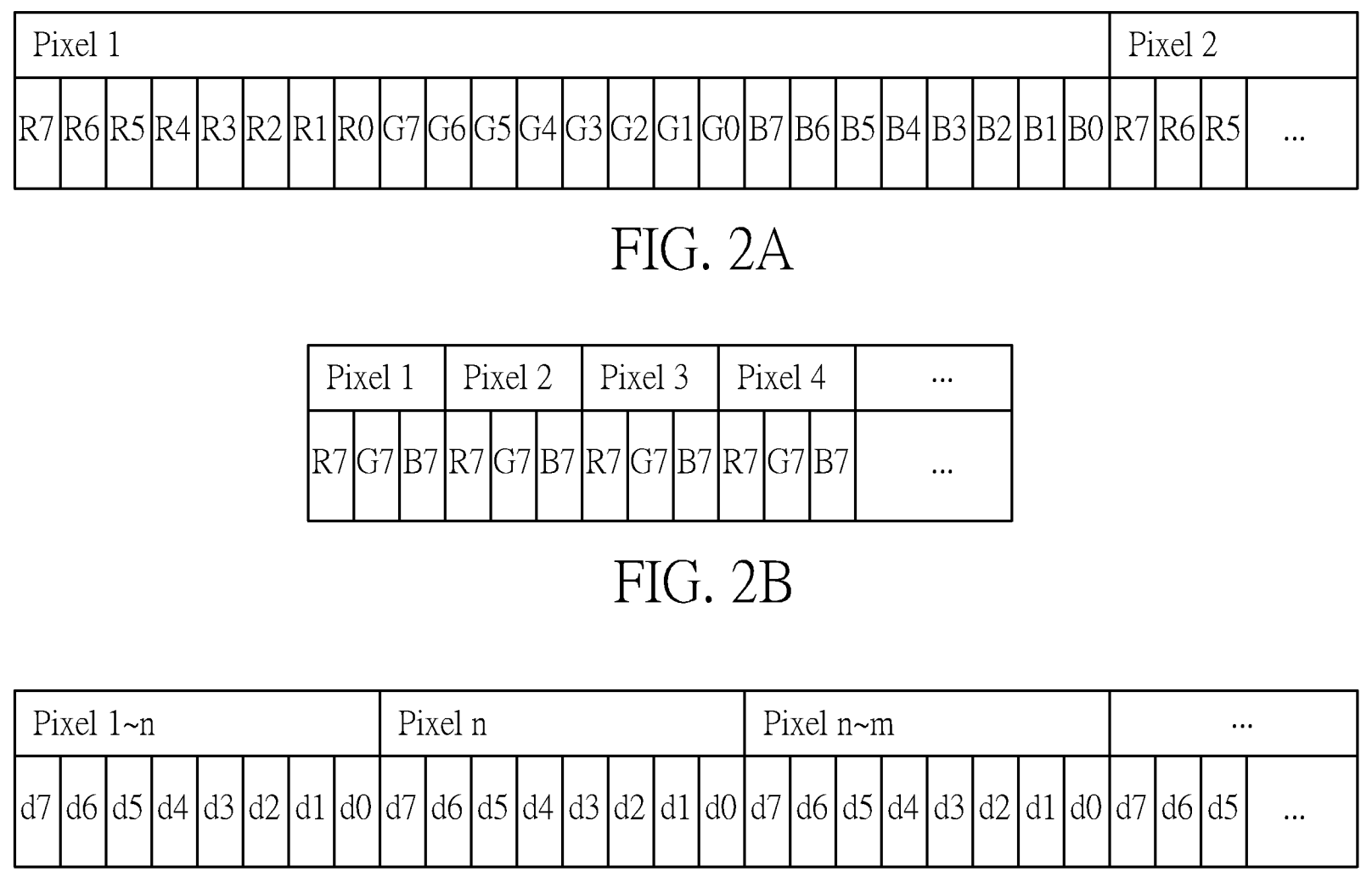

Please refer to FIGS. 2A, 2B and 2C. FIG. 2A is a schematic diagram of the data format frmt2 according to an embodiment of the present invention; FIG. 2B is a schematic diagram of the data format frmt1 according to an embodiment of the present invention; FIG. 2C is a schematic diagram of the compression data Cmprs_D according to an embodiment of the present invention. In FIG. 2A, each pixel includes three sub-pixels R, G, B, and each sub-pixel may be represented by 8 bits. Therefore, each pixel includes 24 bits. In FIG. 2B, each pixel only uses 3 bits to represent three sub-pixels R, G, B. In comparison, the data format frmt1 has less data quantity than the data format frmt2.

The operations of the data compression system 10 are detailed as follows. When the operation mode is the general mode, the host 100 outputs the image data Img_D in the data format frmt2. The image data Img_D in the data format frmt2 may first be passed through the image data unit 121, and then transmitted to the compression unit 122 via the complete data path L2. The compression unit 122 performs the compression procedure on the image data Img_D in the data format frmt2 to generate the compression data Cmprs_D. The switching unit 123 selects the compression data Cmprs_D coming from the complete data path L2, and stores the compression data Cmprs_D in the storage unit 124. The de-compression unit 125 then receives the compression data Cmprs_D, and performs the de-compression procedure on the compression data Cmprs_D to recover the image data Img_D in the data format frmt2. The switching unit 126 transmits the image data Img_D in the data format frmt2 to the display unit 127 via the complete data path L2. Finally, the display unit 127 displays the image data Img_D in the data format frmt2. When the operation mode is switched from the general mode to the particular mode, the host 100 re-transmits transmitted image data Prv_D1 in the data format frmt1 in the next image frame after the switching, where the transmitted image data Prv_D1 has been transmitted in the data format frmrt2 when the operation mode is the general mode. When the host 100 re-transmits the image data Prv_D1 in the data format fmrt1, the display unit 127 displays a black screen, in order to prevent an abnormal image from being displayed. When the operation mode is the particular mode, the host 100 outputs the image data Img_D in the data format frmt1. The image data Img_D in the data format frmt1 first is passed through the image data unit 121, and transmitted to the switching unit 123, bypassing the compression unit 122 via the bypass path L1. The switching unit 123 selects the image data Img_D in the data format frmt1 coming from the bypass path L1, and stores the image data Img_D in the data format frmt1 in the storage unit 124. The switching unit 126 then transmits the image data Img_D in the data format frmt1 to the display unit 127 via the bypass path L1. Finally, the display unit 127 displays the image data Img_D in the data format frmt1. When the operation mode is switched from the particular mode back to the general mode, the host 100 re-transmits an image data Prv_D2 in the data format fmrt2 in next image frame after the switching, and the image data Prv_D2 has been transmitted in the data format fmrt1 when the operation mode is the particular mode. When the host 100 re-transmits the image data Prv_D2 in the data format fmrt2, the display unit 127 displays a black screen, in order to prevent an abnormal image from being displayed. The operations after the operation mode returns to the general mode are illustrated above, and will not be narrated herein. Therefore, when the operation mode is the particular mode, the data compression system 10 transmits the image data Img_D in the data format fmrt1 to the display unit 127 via the bypass path L1 and omits the compression procedure and the de-compression procedure, in order to reduce power consumption.

Figure 3:
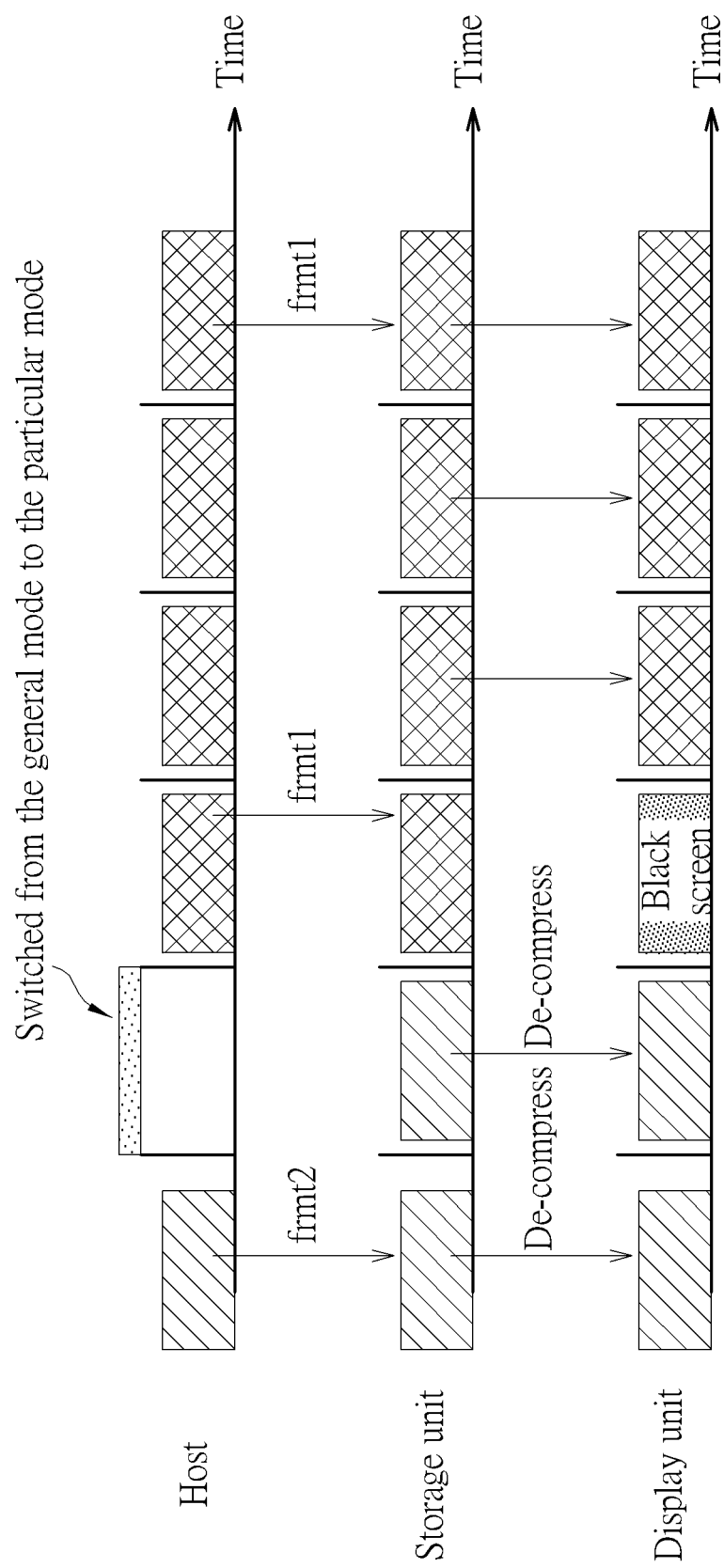
FIG. 3 and FIG. 4 are timing diagrams of image data indifferent output terminals according to an embodiment of the present invention.
Figure 4:
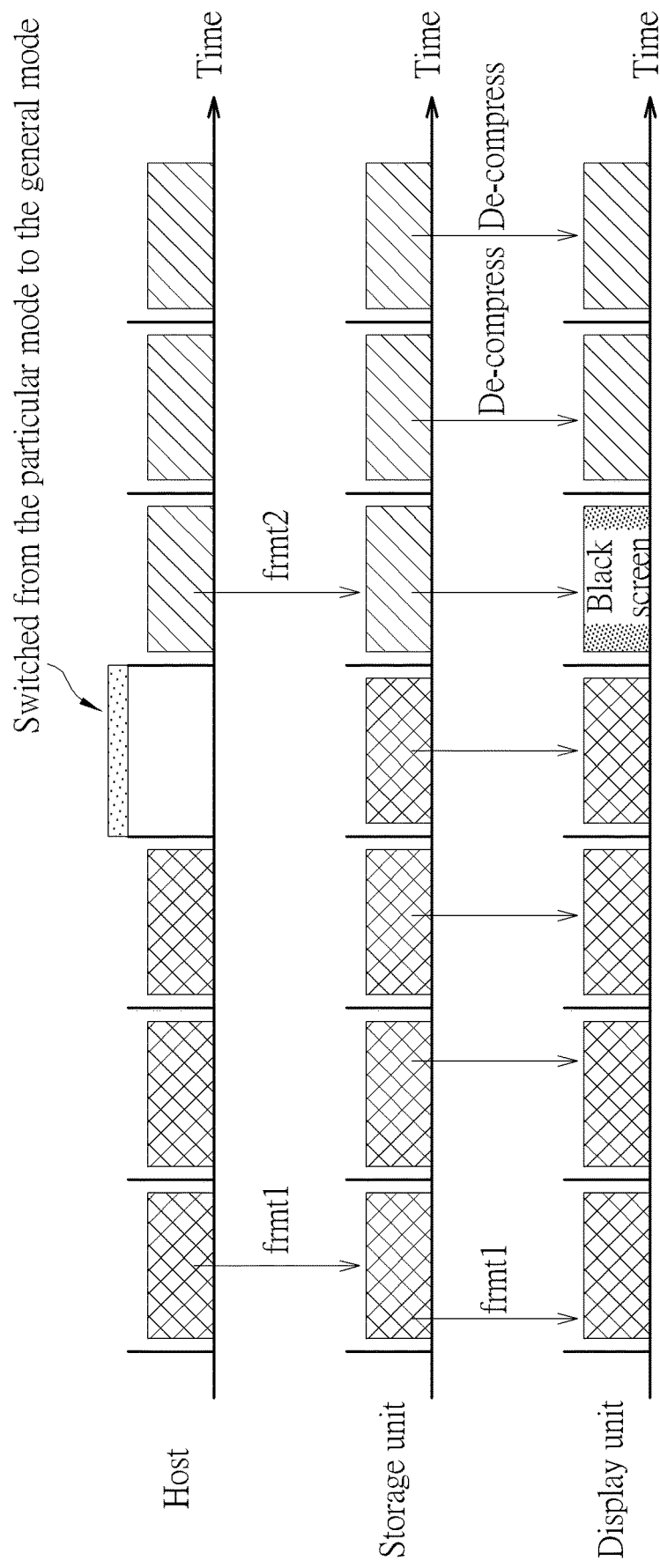

In addition, please refer to FIG. 3 and FIG. 4. FIG. 3 is a timing diagram of image data in different output terminals when the operation mode is switched from the general mode to the particular mode according to an embodiment of the present invention; FIG. 4 is a timing diagram of image data in different output terminals when the operation mode is switched from the particular mode to the general mode according to an embodiment of the present invention. In FIG. 3 and FIG. 4, the horizontal axis represents time, on which each time interval denotes a time period of an image frame. Details of FIG. 3 and FIG. 4 are illustrated above, and will not be narrated herein.

Figure 5:
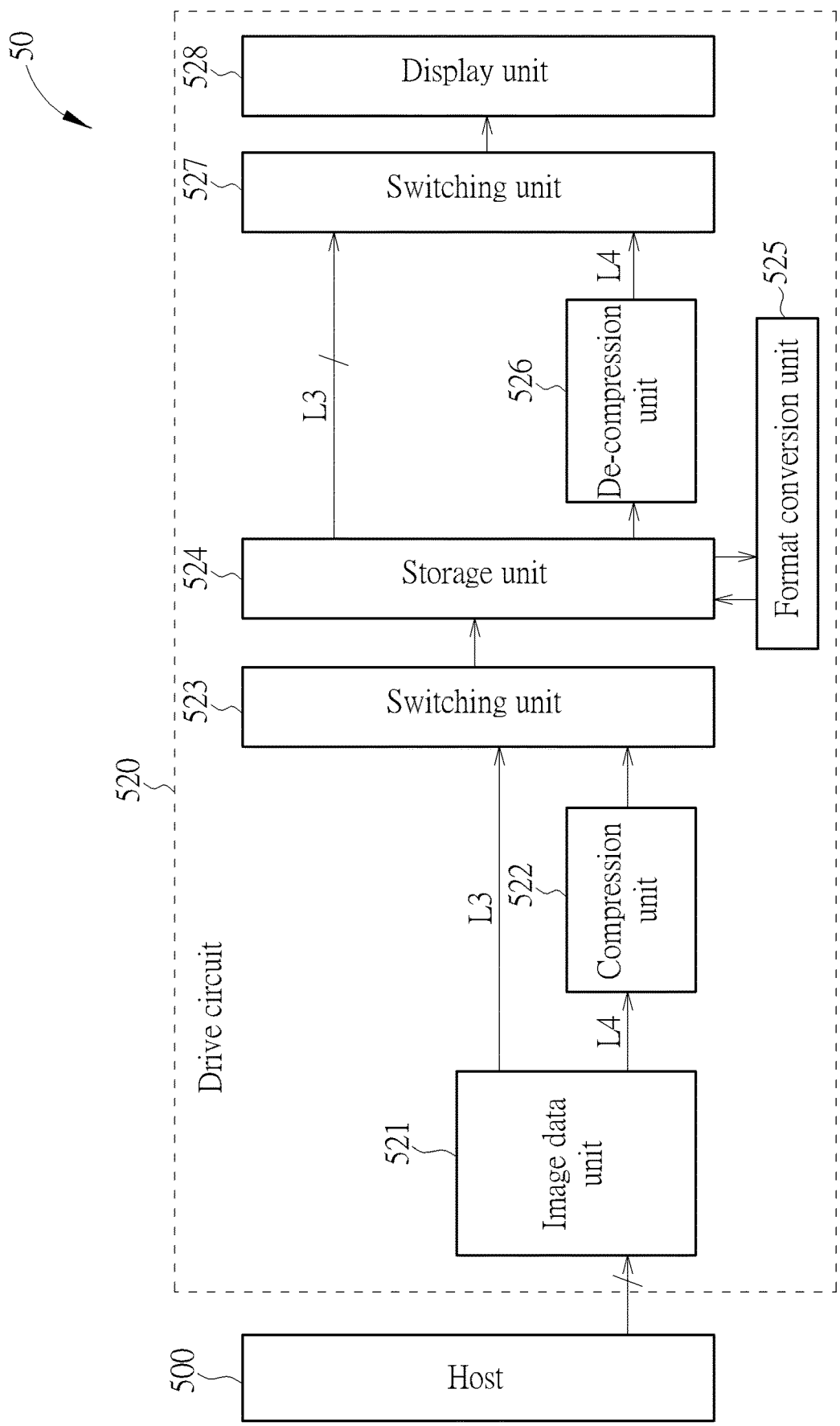
FIG. 5 is a schematic diagram of a data compression system according to another embodiment of the present invention.

Please refer to FIG. 5, which is a schematic diagram of a data compression system 50 according to another embodiment of the present invention. The data compression system 50 may be utilized in an LCD. The basic structures of the data compression system 50 are similar to those of the data compression system 10; hence data in the same output terminals are denoted by the same symbols. The data compression system 50 includes a host 500 and a drive circuit 520. The host 500 is utilized for outputting an image data Img_D, which is in a data format fmrt2. Preferably, the drive circuit 520 may be realized by a driving IC. The drive circuit 520 includes an image data unit 521, a compression unit 522, switching units 523 and 527, a storage unit 524, a format conversion unit 525, a de-compression unit 526, a display unit 528, a bypass path L3 and a complete data path L4. The switching units 523 and 527 are utilized for switching between the bypass path L3 and the complete data path L4. The compression unit 522 is utilized for receiving the image data Img_D and performing the compression procedure on the image data Img_D to generate the compression data Cmprs_D according to the operation mode. The storage unit 524, coupled to the compression unit 522 and the host 500, is utilized for storing the compression data Cmprs_D and the image data Img_D. Preferably, the storage unit 524 may be an SRAM. The format conversion unit 525, coupled to the storage unit 524, is utilized for performing a format conversion procedure to convert the image data Img_D into the data format frmt1 or the data format frmt2. The de-compression unit 526, coupled to the storage unit 524, is utilized for receiving the compression data Cmprs_D and performing the de-compression procedure on the compression data Cmprs_D to recover the image data Img_D according to the operation mode. The display unit 528 is utilized for displaying the image data Img_D.

When the operation mode is the particular mode, the image data Img_D in the data format frmt2 is transmitted to the storage unit 524 via the bypass path. The format conversion unit 525 reads the image data Img_D in the data format frmt2 from the storage unit 524, converts the image data Img_D in the data format frmt2 into the data format frmt1 with smaller amount of data, and stores the data back to the storage unit 524, where the compression procedure and the de-compression procedure are both omitted. As a result, unnecessary power consumption may be prevented.

The operations of the data compression system 50 are detailed as follows. When the operation mode is the general mode, the host 500 outputs the image data Img_D in the data format frmt2. The image data Img_D in the data format frmt2 is first passed through the image data unit 521, and transmitted to the compression unit 522 via the complete data path L4. The compression unit 522 performs the compression procedure on the image data Img_D in the data format frmt2 to generate the compression data Cmprs_D. The switching unit 523 selects the compression data Cmprs_D from the complete data path L4, and stores the compression data Cmprs_D in the storage unit 524. The de-compression unit 526 then receives the compression data Cmprs_D, and performs the de-compression procedure on the compression data Cmprs_D to recover the image data Img_D in the data format frmt2. The switching unit 527 transmits the image data Img_D in the data format frmt2 to the display unit 528 via the complete data path L4. Finally, the display unit 528 displays the image data Img_D in the data format frmt2. When the operation mode is switched from the general mode to the particular mode, the host 500 outputs the image data Img_D in the data format frmt2 to the image data unit 521, and transmits the image data Img_D in the data format frmt2 to the storage unit 524 via the bypass path L3. The format conversion unit 525 reads the image data Img_D in the data format frmt2 from the storage unit 524 in the next image frame after the switching, and converts the image data Img_D from the data format frmt2 into the data format frmt1 and then stores the image data Img_D back to the storage unit 524. When the format conversion unit 525 performs the format conversion procedure, the display unit 528 displays a black screen, in order to prevent an abnormal image from being displayed. When the format conversion procedure is accomplished, the display unit 528 may display the image data Img_D in the data format frmt1. When the operation mode is switched from the particular mode back to the general mode, the format conversion unit 525 reads the image data Img_D in the data format frmt1 from the storage unit 524 in the next image frame after the switching, and converts the image data Img_D from the data format frmt1 into the data format frmt2 and then stores the image data Img_D back to the storage unit 524. Similarly, when the format conversion unit 525 performs the format conversion procedure, the display unit 528 may display a black screen, in order to prevent an abnormal image from being displayed. When the format conversion procedure is accomplished, the display unit 528 may display the image data Img_D in the data format frmt2. The operations after the operation mode returns to the general mode are illustrated above, and will not be narrated herein. Therefore, when the operation mode is the particular mode, the data compression system 50 transmits the image data Img_D to the display unit 528 via the bypass path L3, and the compression procedure and the de-compression procedure are omitted, in order to reduce power consumption. Please note that, in comparison with the data compression system 10, in the data compression system 50 the host 500 may not need to re-transmit, and the data format conversion is performed by the format conversion unit 525.

Figure 6:
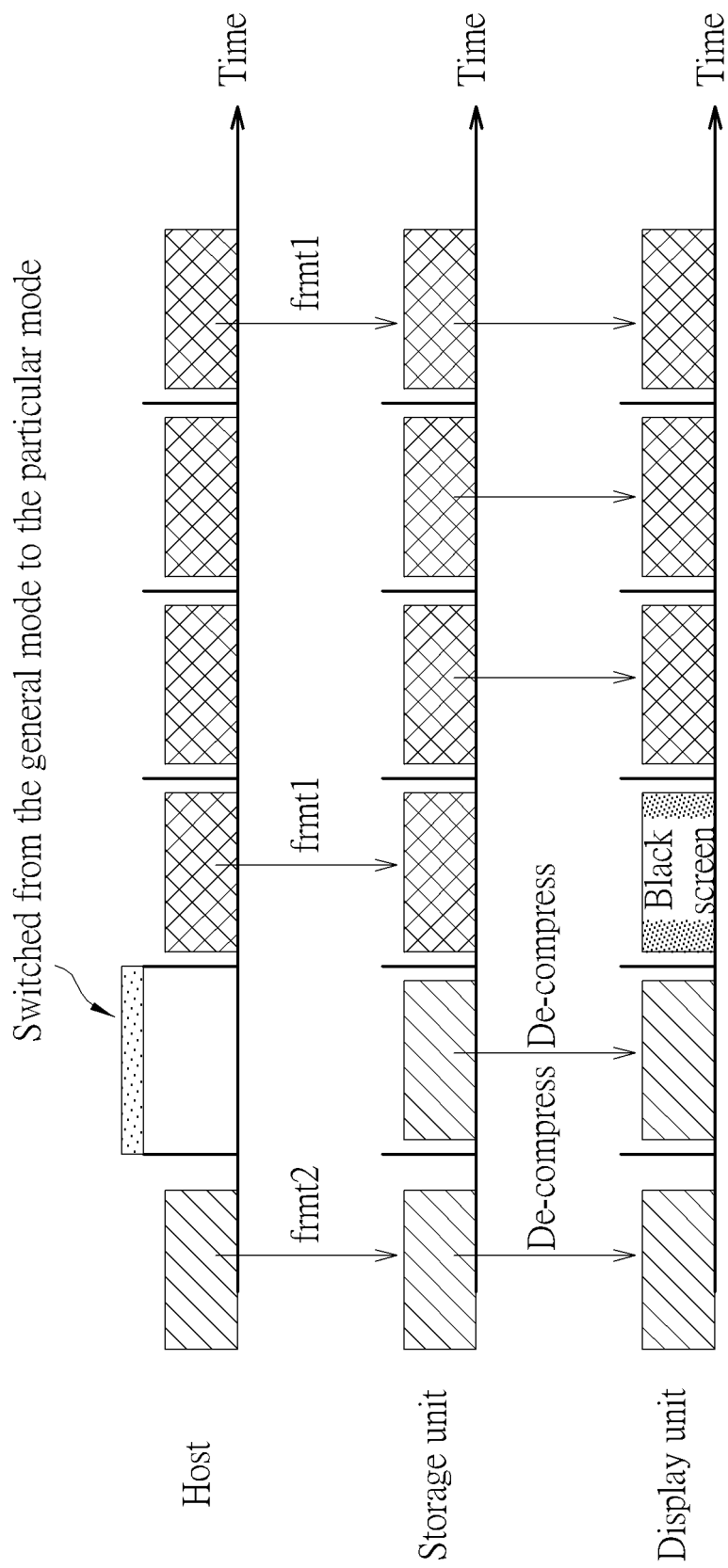
FIG. 6 and FIG. 7 are timing diagrams of image data indifferent output terminals according to an embodiment of the present invention.
Figure 7:
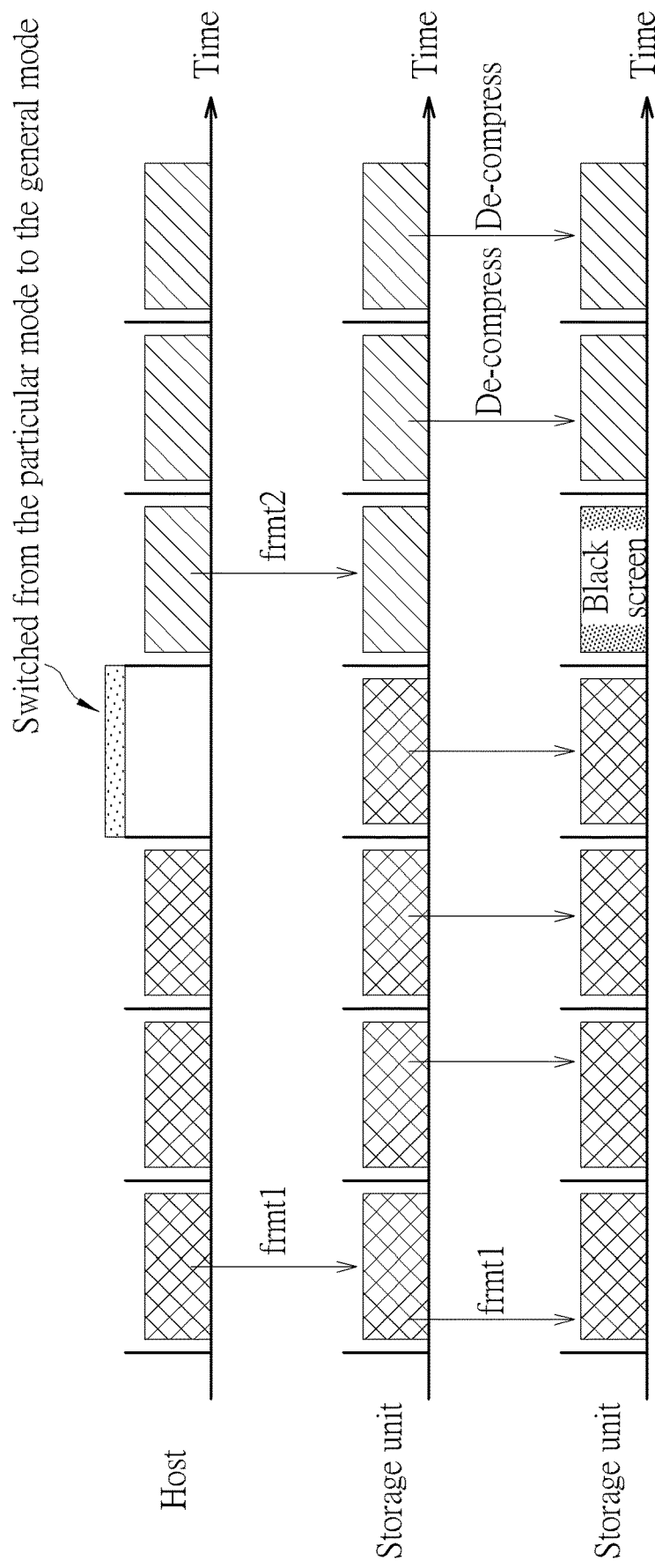

In addition, please refer to FIG. 6 and FIG. 7. FIG. 6 is a timing diagram of image data in different output terminals when the operation mode is switched from the general mode to the particular mode according to an embodiment of the present invention; FIG. 7 is a timing diagram of image data in different output terminals when the operation mode is switched from the particular mode to the general mode according to an embodiment of the present invention. In FIG. 6 and FIG. 7, the horizontal axis represents time, on which each time interval denotes a time period of an image frame. Details of FIG. 6 and FIG. 7 are illustrated above, and will not be narrated herein.

Figure 8:
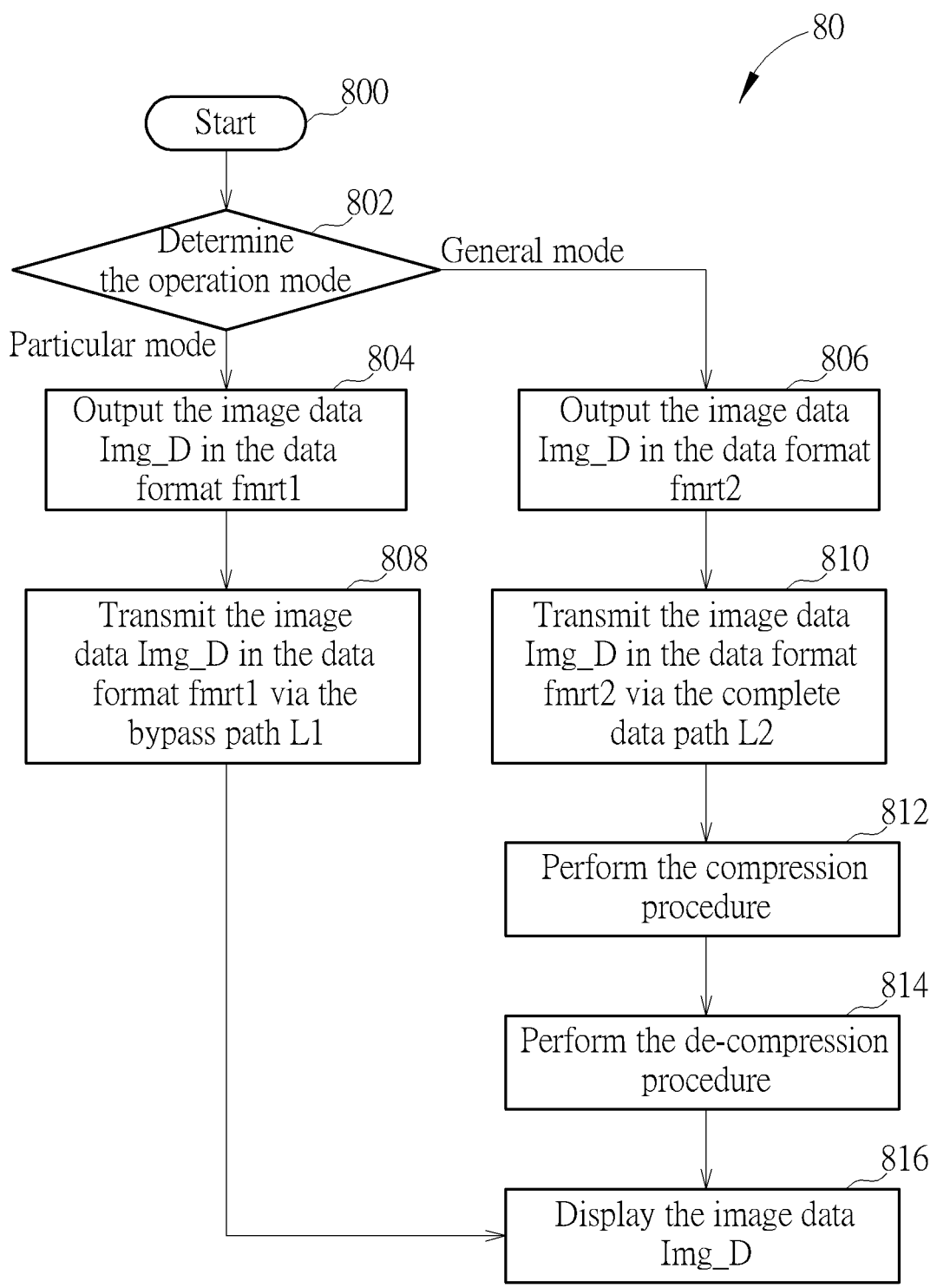
FIG. 8 is a schematic diagram of a process according to an embodiment of the present invention.

The operations related to the data compression system 10 can be summarized into a process 80, as shown in FIG. 8. The process 80, which may be utilized in the data compression system 10 for power saving, includes the following steps:

Step 800: Start.

Step 802: Determine the operation mode. If the operation mode is the particular mode, go to Step 804; if the operation mode is the general mode, go to Step 806.

Step 804: Output the image data Img_D in the data format fmrt1, and go to Step 808.

Step 806: Output the image data Img_D in the data format fmrt2, and go to Step 810.

Step 808: Transmit the image data Img_D in the data format fmrt1 via the bypass path L1, and go to Step 816.

Step 810: Transmit the image data Img_D in the data format fmrt2 via the complete data path L2.

Step 812: Perform the compression procedure.

Step 814: Perform the de-compression procedure.

Step 816: Display the image data Img_D.

According to the process 80, when the operation mode is the particular mode, the data compression system 10 transmits the image data Img_D in the data format fmrt1 via the bypass path L1 and omits the compression procedure and the de-compression procedure, in order to reduce power consumption. When the operation mode is the general mode, the data compression system 10 performs the compression procedure and the de-compression procedure on the image data Img_D in the data format fmrt2 via the complete data path L2. Detailed operations of the process 80 are illustrated above, and will not be narrated herein.

Figure 9:
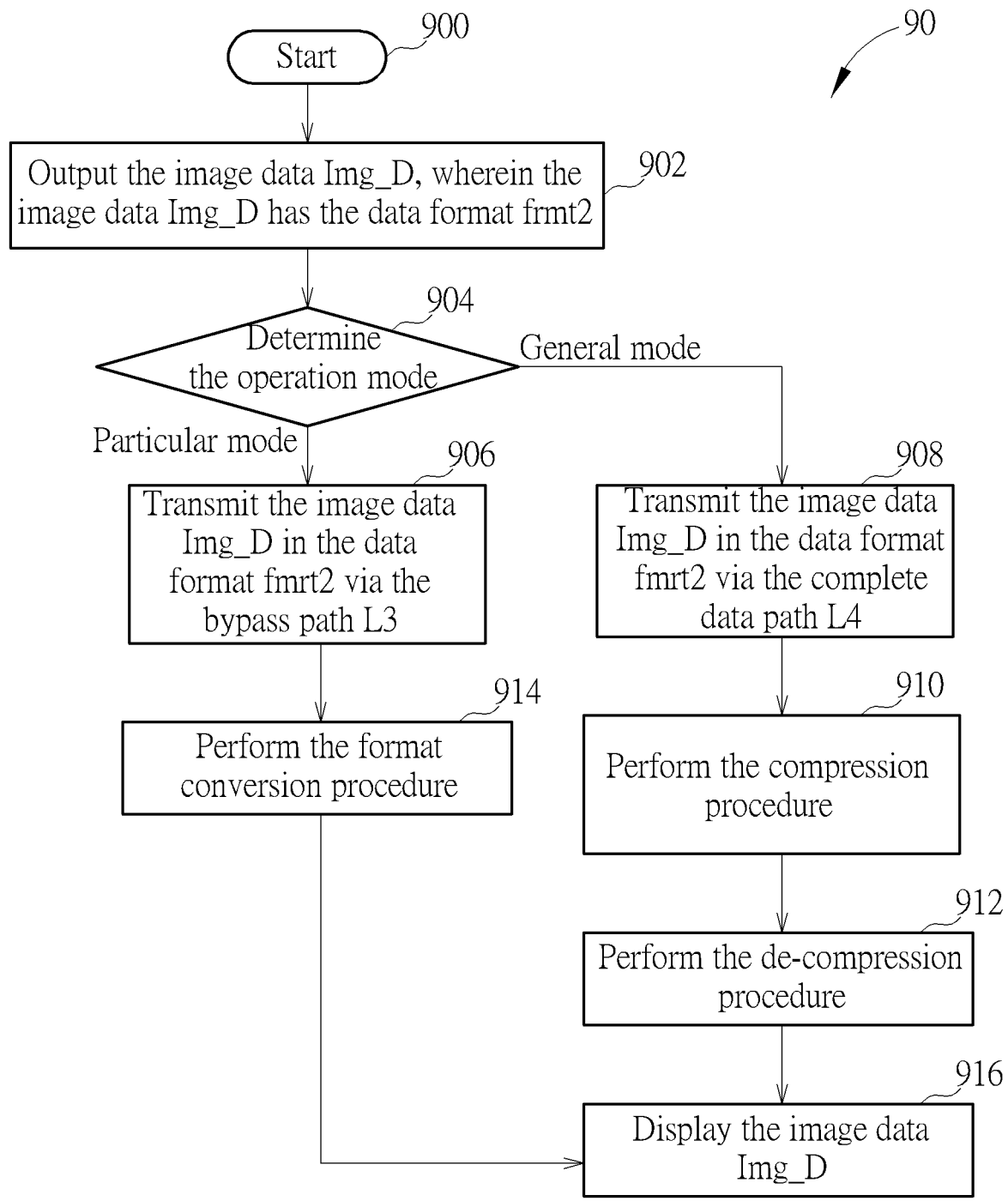
FIG. 9 is a schematic diagram of a process according to an embodiment of the present invention.

The operations related to the data compression system 50 can be summarized into a process 90, as shown in FIG. 9. The process 90, which may be utilized in the data compression system 50 for power saving, includes the following steps:

Step 900: Start.

Step 902: Output the image data Img_D, wherein the image data Img_D has the data format frmt2.

Step 904: Determine the operation mode. If the operation mode is the particular mode, go to Step 906; if the operation mode is the general mode, go to Step 908.

Step 906: Transmit the image data Img_D in the data format fmrt2 via the bypass path L3, and go to Step 914.

Step 908: Transmit the image data Img_D in the data format fmrt2 via the complete data path L4.

Step 910: Perform the compression procedure.

Step 912: Perform the de-compression procedure, and go to Step 916.

Step 914: Perform the format conversion procedure.

Step 916: Display the image data Img_D.

According to the process 90, when the operation mode is the particular mode, the data compression system 50 transmits the image data Img_D in the data format fmrt2 via the bypass path L3 and omits the compression procedure and the de-compression procedure, and performs the format conversion procedure to convert the image data Img_D from the data format fmrt2 into the data format fmrt1. When the operation mode is the general mode, the data compression system performs the compression procedure and the decompression procedure on the image data Img_D in the data format fmrt2 via the complete data path L4. Detailed operations of the process 90 are illustrated above, and will not be narrated herein.

It is noted that in some embodiments, the host can inform the driver circuit of the operation mode or whether to compress/decompress the received image data, for example, by a control signal or any indication signal. In the same or alternative embodiments, the driver circuit can determine whether to compress/decompress the received image data or the operation mode based on the received image data such as the format and/or contents of the image data.

In addition, it is noted that not performing the compression/decompression may mean bypassing/omitting the compression/decompression circuit, or alternatively, it can mean that processing the image data with a compression ratio substantially equal to 1 and/or decompress the compressed image data with a decompression ratio substantially equal to 1. In other words, the image data may be transmitted to the compression circuit and/or de-compression circuit, which can process the image data with a compression ratio substantially equal to 1 and decompress the compressed image data with a corresponding decompression ratio substantially equal to 1, respectively.

Furthermore, in some embodiments, in a first operation mode (for example, a normal mode or a high power mode), a first compression procedure can be performed with a first compression algorithm and/or a first compression ratio; and in a second operation mode (for example, a particular mode or a low power mode or a power-saving mode), a second compression procedure can be performed with a second compression algorithm and/or a second compression ratio. The second compression algorithm for example may be simpler than the first compression algorithm and/or the second compression ratio can be unequal to 1 but lower than the first compression ratio and/or image quality can be lower and/or the size of compressed image data can be larger compared to the normal mode, and accordingly power consumption can be still reduced in the second mode. Correspondingly, in both the normal mode and the particular mode, suitable decompression mechanisms such as decompression algorithm and/or decompression ratios corresponding to the first and second compression algorithm and/or compression ratios can be adopted to recover the image data.

In addition, the operation mode or whether to compress/decompress the received image data may depend upon or be determined according to the format and/or bit numbers and/or size (data quantity) and/or color information of the received image data. However, the claimed invention is not limited thereto. For example, in any conditions in which power consumption is required or desired to be reduced, the compression/decompression can be omitted (or can be still saved with a different mechanism capable of reducing power consumption as explained above). The conditions can be determined by the host which then inform the driver circuit and/or determined by the driver circuit which may make determination itself.

To sum up, an embodiment of the present invention may determine a transmitting path of the image data (the bypass path or the complete data path) according to the operation mode. When the operation mode is the particular mode without full color information (the color gamut reduction mode, the partial area display mode and the scale up display mode), an embodiment of the present invention may transmit the image data in a data format with smaller amount of data or convert the image data into a data format with smaller amount of data to transmit the image data via the bypass path, wherein the compression procedure and the de-compression procedure are omitted, in order to achieve power saving.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A drive circuit applicable to a display device, comprising:
   a first signal path, configured to receive image data and transmit the image data, the first signal path comprising:
      a compression unit, configured to perform a compression procedure on the image data to generate compression data;
      a storage unit, configured to be coupled to the compression unit, configured to store the compression data; and
      a de-compression unit, coupled to the storage unit, configured to receive the compression data and perform a de-compression procedure on the compression data to recover the image data; and
   a second signal path, configured to, when the image data is not transmitted by the first signal path, transmit the image data to the storage unit so as to bypass the compression unit, and transmit the image data received from the storage unit to a display unit so as to bypass the de-compression unit,
   wherein the received image data is passed through one of the first signal path and the second signal path depending upon a data quantity of the received image data;
   wherein the data quantity of the received image data has at least a first predetermined size or a second predetermined size, wherein the first predetermined size is indicated by at least one of a first data format of the received image data, first color information of the received image data, and a first operation mode, and the second predetermined size is indicated by at least one of a second data format of the received image data, second color information of the received image data, and a second operation mode.

2. The drive circuit of claim 1, wherein when the data quantity of the image data has the first predetermined size, the image data is passed through the first signal path, and when the data quantity of the image data has the second predetermined size less than the first predetermined size, the image data is passed through the second signal path.

3. The drive circuit of claim 1, further comprising a format conversion unit, coupled to the storage unit, configured to perform a format conversion procedure to convert the image data in the first data format received from the storage unit into the second data format and/or convert the image data in the second data format received from the storage unit into the first data format, and store the converted image data in the storage unit.

4. The drive circuit of claim 1, wherein the received image data is passed through one of the first signal path and the second signal path depending upon the data quantity of the received image data without comparing the data quantity of the received image data with a size of the storage unit.

5. A drive circuit applicable to a display device, comprising:
a first signal path, configured to receive image data and transmit the image data, the first signal path comprising:
a compression unit, configured to perform a compression procedure on the image data to generate compression data;
a storage unit, configured to be coupled to the compression unit, configured to store the compression data; and
a de-compression unit, coupled to the storage unit, configured to receive the compression data and perform a de-compression procedure on the compression data to recover the image data; and
a second signal path, configured to, when the image data is not transmitted by the first signal path, transmit the image data to the storage unit so as to bypass the compression circuit, and transmit the image data received from the storage unit to a display unit so as to bypass the de-compression circuit,
wherein the drive circuit is further configured to be informed of whether to operate in a first operation mode or a second operation mode, and responsively pass the image data through the first signal path in the first operation mode and pass the image data through the second signal path in the second operation mode;
wherein the first operation mode and the second operation mode indicate a first data quantity of the image data and a second data quantity of the image data, respectively.

6. The drive circuit of claim 5, wherein the second operation mode is one of a color gamut reduction mode, a partial area display mode, and a scale up display mode.

7. The drive circuit of claim 5, wherein the received image data in the second operation mode has less color information and/or lower data quantity than the first operation mode.

8. The drive circuit of claim 5, wherein the received image data in the second operation mode has a data format different from that in the first operation mode.

9. A drive circuit applicable to a display device, comprising:
a first signal path, configured to receive image data and transmit the image data, the first signal path comprising:
a compression unit, configured to perform a compression procedure on the image data to generate compression data;
a storage unit, configured to be coupled to the compression unit, configured to store the compression data; and
a de-compression unit, coupled to the storage unit, configured to receive the compression data and perform a de-compression procedure on the compression data to recover the image data; and
a second signal path, configured to, when the image data is not transmitted by the first signal path, transmit the image data to the storage unit so as not to perform the compression procedure, and transmit the image data received from the storage unit to a display unit so as not to perform the de-compression procedure,
wherein the drive circuit is further configured to determine whether to operate in a first operation mode or in a second operation mode according to characteristics of the received image data, and pass the image data through the first signal path in the first operation mode and pass the image data through the second signal path in the second operation mode;
wherein the first operation mode and the second operation mode indicate a first data quantity of the image data and a second data quantity of the image data, respectively.

10. The drive circuit of claim 9, wherein the second operation mode is one of a color gamut reduction mode, a partial area display mode, and a scale up display mode.

11. The drive circuit of claim 9, wherein the received image data in the second operation mode has less color information and/or lower data quantity than the first operation mode.

12. The drive circuit of claim 9, wherein the received image data in the second operation mode has a data format different from that in the first operation mode.

13. A data compression system applicable to a display device, comprising:
a host, for outputting image data; and
a drive circuit, coupled to the host, comprising:
a first signal path, configured to receive the image data and transmit the image data, the first signal path comprising:
a compression unit, configured to perform a compression procedure on the image data to generate compression data;
a storage unit, configured to be coupled to the compression unit, configured to store the compression data; and
a de-compression unit, coupled to the storage unit, configured to receive the compression data and perform a de-compression procedure on the compression data to recover the image data; and
a second signal path, configured to, when the image data is not transmitted by the first signal path, transmit the image data to the storage unit so as to bypass the compression unit, and transmit the image data received from the storage unit to a display unit so as to bypass the de-compression unit,
wherein the received image data is passed through one of the first signal path and the second signal path depending upon a data quantity of the received image data;
wherein the data quantity of the received image data has at least a first predetermined size or a second predetermined size, wherein the first predetermined size is indicated by at least one of a first data format of the received image data, first color information of the received image data, and a first operation mode, and the second predetermined size is indicated by at least one of a second data format of the received image data, second color information of the received image data, and a second operation mode.

14. The data compression system of claim 13, wherein when the data quantity of the image data has the first predetermined size, the image data is passed through the first signal path, and when the data quantity of the image data has the second predetermined size less than the first predetermined size, the image data is passed through the second signal path.

15. The data compression system of claim 13, wherein the drive circuit further comprises a format conversion unit, coupled to the storage unit, configured to perform a format conversion procedure to convert the image data in the first data format received from the storage unit into the second data format and/or convert the image data in the second data format received from the storage unit into the first data format, and store the converted image data in the storage unit.

16. The data compression system of claim 13, wherein the received image data is passed through one of the first signal path and the second signal path depending upon the data quantity of the received image data without comparing the data quantity of the received image data with a size of a storage unit.

17. A data compression system, comprising:
a host, configured to output image data; and
a drive circuit, coupled to the host to receive the image data, and comprising:
a first signal path, configured to receive the image data and transmit the image data, the first signal path comprising:
a compression unit, configured to perform a compression procedure on the image data to generate compression data;
a storage unit, configured to be coupled to the compression unit, configured to store the compression data; and
a de-compression unit, coupled to the storage unit, configured to receive the compression data and perform a de-compression procedure on the compression data to recover the image data; and
a second signal path, configured to, when the image data is not transmitted by the first signal path, transmit the image data to the storage unit so as to bypass the compression unit, and transmit the image data received from the storage unit to a display unit so as to bypass the de-compression unit,
wherein the drive circuit is further configured to be informed by the host of whether to operate in a first operation mode or a second operation mode, and responsively pass the image data through the first signal path in the first operation mode and pass the image data through the second signal path in the second operation mode;
wherein the first operation mode and the second operation mode indicate a first data quantity of the image data and a second data quantity of the image data, respectively.

18. The data compression system of claim 17, wherein the second operation mode is one of a color gamut reduction mode, a partial area display mode, and a scale up display mode.

19. The data compression system of claim 17, wherein the received image data in the second operation mode has less color information and/or lower data quantity than the first operation mode.

20. The data compression system of claim 17, wherein the received image data in the second operation mode has a data format different from that in the first operation mode.

21. A data compression system, comprising:
a host, configured to output image data; and
a drive circuit, coupled to the host to receive the image data, and comprising:
a first signal path, configured to receive the image data and transmit the image data, the first signal path comprising:
a compression unit, configured to perform a compression procedure on the image data to generate compression data;
a storage unit, configured to be coupled to the compression unit, configured to store the compression data; and
a de-compression unit, coupled to the storage unit, configured to receive the compression data and perform a de-compression procedure on the compression data to recover the image data; and
a second signal path, configured to, when the image data is not transmitted by the first signal path, transmit the image data to the storage unit so as not to perform the compression procedure, and transmit the image data received from the storage unit to a display unit so as not to perform the de-compression procedure,
wherein the drive circuit is further configured to determine whether to operate in a first operation mode or in a second operation mode according to characteristics of the image data received from the host, and pass the image data through the first signal path in the first operation mode and pass the image data through the second signal path in the second operation mode;
wherein the first operation mode and the second operation mode indicate a first data quantity of the image data and a second data quantity of the image data, respectively.

22. The data compression system of claim 21, wherein the second operation mode is one of a color gamut reduction mode, a partial area display mode, and a scale up display mode.

23. The data compression system of claim 21, wherein the received image data in the second operation mode has less color information and/or lower data quantity than the first operation mode.

24. The data compression system of claim 21, wherein the received image data in the second operation mode has a data format different from that in the first operation mode.

25. A power saving method, comprising:
passing image data through a first signal path, wherein the first signal path comprises:
a compression unit, configured to perform a compression procedure on image data to generate compression data;
a storage unit, coupled to the compression unit, configured to store the compression data; and
a de-compression unit, coupled to the storage unit, configured to receive the compression data and perform a de-compression procedure on the compression data to recover the image data; and
passing image data through a second signal path, wherein the second signal path is configured to receive image data, transmit the image data to the storage unit so as to bypass the compression unit, and transmit the image data received from the storage unit to a display unit so as to bypass the de-compression unit;
wherein the received image data is passed through one of the first signal path and the second signal path depending upon a data quantity of the received image data;
wherein the data quantity of the received image data has at least a first predetermined size or a second predetermined size, wherein the first predetermined size is indicated by at least one of a first data format of the received image data, first color information of the received image data, and a first operation mode, and the second predetermined size is indicated by at least one of a second data format of the received image data, second color information of the received image data, and a second operation mode.

26. The power saving method of claim 25, wherein when the data quantity of the image data has the first predetermined size, the image data is passed through the first signal path, and when the data quantity of the image data has the second predetermined size less than the first predetermined size, the image data is passed through the second signal path.

27. The power saving method of claim 25, further comprising performing a format conversion procedure to convert the image data in the first data format received from the storage unit into the second data format or convert the image data in the second data format received from the storage unit into the first data format, and store the converted image data in the storage unit.

28. The power saving method of claim 25, wherein the received image data is passed through one of the first signal path and the second signal path depending upon the data quantity of the received image data without comparing the data quantity of the received image data with a size of the storage unit.

29. A power saving method, comprising:
  passing image data through a first signal path, the first signal path configured to receive image data and transmit the image data and comprising:
    a compression unit, configured to perform a compression procedure on the image data to generate compression data;
    a storage unit, configured to be coupled to the compression unit, configured to store the compression data; and
    a de-compression unit, coupled to the storage unit, configured to receive the compression data and perform a de-compression procedure on the compression data to recover the image data;
  passing image data through a second signal path, the second signal path configured to, when the image data is not transmitted by the first signal path, transmit the image data to the storage unit so as to bypass the compression unit, and transmit the image data received from the storage unit to a display unit so as to bypass the de-compression unit; and
  receiving an indication signal from a host to be informed by the host of whether to operate in a first operation mode or a second operation mode, and responsively passing the image data through the first signal path in the first operation mode and passing the image data through the second signal path in the second operation mode;
  wherein the first operation mode and the second operation mode indicate a first data quantity of the image data and a second data quantity of the image data, respectively.

30. The power saving method of claim 29, wherein the second operation mode is one of a color gamut reduction mode, a partial area display mode, and a scale up display mode.

31. The power saving method of claim 29, wherein the received image data in the second operation mode has less color information and/or lower data quantity than the first operation mode.

32. The power saving method of claim 29, wherein the received image data in the second operation mode has a data format different from that in the first operation mode.

33. A power saving method, comprising:
  receiving image data from an input configured to be coupled to a host;
  passing image data through a first signal path, the first signal path configured to receive image data and transmit the image data and comprising:
    a compression unit, configured to perform a compression procedure on the image data to generate compression data;
    a storage unit, configured to be coupled to the compression unit, configured to store the compression data; and
    a de-compression unit, coupled to the storage unit, configured to receive the compression data and perform a de-compression procedure on the compression data to recover the image data;
  passing image data through a second signal path, the second signal path configured to, when the image data is not transmitted by the first signal path, transmit the image data to the storage unit so as not to perform the compression procedure, and transmit the image data received from the storage unit to a display unit so as not to perform the de-compression procedure; and
  determining whether to operate in a first operation mode or in a second operation mode according to characteristics of the received image data, and passing the image data through the first signal path in the first operation mode and passing the image data through the second signal path in the second operation mode;
  wherein the first operation mode and the second operation mode indicate a first data quantity of the image data and a second data quantity of the image data, respectively.

34. The power saving method of claim 33, wherein the second operation mode is one of a color gamut reduction mode, a partial area display mode, and a scale up display mode.

35. The power saving method of claim 33, wherein the received image data in the second operation mode has less color information and/or lower data quantity than the first operation mode.

36. The power saving method of claim 33, wherein the received image data in the second operation mode has a data format different from that in the first operation mode.

37. A power saving method for a display device comprising:
  performing a first signal processing procedure, wherein the first signal processing procedure comprises:
    performing a first compression procedure on image data to generate compression data;
    storing the compression data in a storage unit; and
    performing a first de-compression procedure on the compression data to recover the image data; and
  performing a second signal processing procedure when the first signal processing procedure is not performed, wherein the second signal processing procedure comprises:
    processing the image data for storing in the storage unit without performing the first compression procedure; and
    processing the image data received from the storage unit for transmitting to a display unit without performing the first de-compression procedure;
  wherein the first signal processing procedure or the second signal processing procedure is performed on the received image data depending upon a data quantity of the received image data;
  wherein the data quantity of the received image data has at least a first predetermined size or a second predetermined size, wherein the first predetermined size is indicated by at least one of a first data format of the received image data, first color information of the received image data, and a first operation mode, and the second predetermined size is indicated by at least one of a second data format of the received image data, second color information of the received image data, and a second operation mode.

38. The power saving method of claim 37, wherein when the data quantity of the image data has the first predetermined size, the first signal processing procedure is performed on the image data, and when the data quantity of the image data has the second predetermined size less than the first predetermined size, the second signal processing procedure is performed on the image data.

39. The power saving method of claim 37, wherein the second signal processing procedure comprises:
   transmitting the image data to the storage unit without performing any compression procedure; and
   transmitting the image data received from the storage unit to a display unit without performing any de-compression procedure.

40. The power saving method of claim 37, wherein the second signal processing procedure comprises:
   performing a second compression procedure on image data to generate compression data;
   storing the compression data in the storage unit; and
   performing a second de-compression procedure on the compression data to recover the image data, wherein a second compression ratio and/or a second compression algorithm of the second compression procedure is different from a first compression ratio and/or a first compression algorithm of the first compression procedure.

41. The power saving method of claim 40, wherein the second compression ratio of the second compression procedure is substantially equal to 1.

42. The power saving method of claim 40, wherein the second compression ratio of the second compression procedure is unequal to 1 and lower than the first compression ratio of the first compression procedure.

43. The power saving method of claim 37, further comprising performing a format conversion procedure to convert the image data in a first data format received from the storage unit into a second data format or convert the image data in the second data format received from the storage unit into the first data format, and store the converted image data in the storage unit.

44. The power saving method of claim 37, wherein the first signal processing procedure or the second signal processing procedure is performed on the received image data depending upon the data quantity of the received image data without comparing the data quantity of the received image data with a size of the storage unit.

45. A power saving method for a display device comprising:
   performing a first signal processing procedure, wherein the first signal processing procedure comprises:
      performing a first compression procedure on image data to generate compression data;
      storing the compression data in a storage unit; and
      performing a first de-compression procedure on the compression data to recover the image data;
   performing a second signal processing procedure when the first signal processing procedure is not performed, wherein the second signal processing procedure comprises:
      processing the image data for storing in the storage unit without performing the first compression procedure; and
      processing the image data received from the storage unit for transmitting to a display unit without performing the first de-compression procedure; and
   receiving an indication signal from a host to be informed by the host of whether to operate in a first operation mode or a second operation mode, and responsively performing the first signal processing procedure in the first operation mode and performing the second signal processing procedure in the second operation mode;
   wherein the first operation mode and the second operation mode indicate a first data quantity of the image data and a second data quantity of the image data, respectively.

46. The power saving method of claim 45, wherein the second operation mode is one of a color gamut reduction mode, a partial area display mode, and a scale up display mode.

47. The power saving method of claim 45, wherein the received image data in the second operation mode has less color information and/or lower data quantity than the first operation mode.

48. The power saving method of claim 45, wherein the received image data in the second operation mode has a data format different from that in the first operation mode.

49. The power saving method of claim 45, wherein the second signal processing procedure comprises:
   transmitting the image data to the storage unit without performing any compression procedure; and
   transmitting the image data received from the storage unit to a display unit without performing any de-compression procedure.

50. The power saving method of claim 45, wherein the second signal processing procedure comprises:
   performing a second compression procedure on image data to generate compression data;
   storing the compression data in the storage unit; and
   performing a second de-compression procedure on the compression data to recover the image data, wherein a second compression ratio and/or a second compression algorithm of the second compression procedure is different from a first compression ratio and/or a first compression algorithm of the first compression procedure.

51. The power saving method of claim 50, wherein the second compression ratio of the second compression procedure is substantially equal to 1.

52. The power saving method of claim 50, wherein the second compression ratio of the second compression procedure is unequal to 1 and lower than the first compression ratio of the first compression procedure.

53. The power saving method of claim 45, further comprising performing a format conversion procedure to convert the image data in a first data format received from the storage unit into a second data format or convert the image data in the second data format received from the storage unit into the first data format, and store the converted image data in the storage unit.

54. A power saving method for a display device comprising:
   performing a first signal processing procedure, wherein the first signal processing procedure comprises:
      performing a first compression procedure on image data to generate compression data;
      storing the compression data in a storage unit; and
      performing a first de-compression procedure on the compression data to recover the image data;
   performing a second signal processing procedure when the first signal processing procedure is not performed, wherein the second signal processing procedure comprises:
      processing the image data for storing in the storage unit without performing the first compression procedure; and
      processing the image data received from the storage unit for transmitting to a display unit without performing the first de-compression procedure; and determining whether to operate in a first operation mode or in a second operation mode according to characteristics of the received image data, and performing the first signal processing procedure in the first operation mode and performing the second signal processing procedure in the second operation mode;

wherein the first operation mode and the second operation mode indicate a first data quantity of the image data and a second data quantity of the image data, respectively.

55. The power saving method of claim 54, wherein the second operation mode is one of a color gamut reduction mode, a partial area display mode, and a scale up display mode.

56. The power saving method of claim 54, wherein the received image data in the second operation mode has less color information and/or lower data quantity than the first operation mode.

57. The power saving method of claim 54, wherein the received image data in the second operation mode has a data format different from that in the first operation mode.

58. The power saving method of claim 54, wherein the second signal processing procedure comprises:

transmitting the image data to the storage unit without performing any compression procedure; and transmitting the image data received from the storage unit to a display unit without performing any de-compression procedure.

59. The power saving method of claim 54, wherein the second signal processing procedure comprises:

performing a second compression procedure on image data to generate compression data;

storing the compression data in the storage unit; and performing a second de-compression procedure on the compression data to recover the image data, wherein a second compression ratio and/or a second compression algorithm of the second compression procedure is different from a first compression ratio and/or a first compression algorithm of the first compression procedure.

60. The power saving method of claim 59, wherein the second compression ratio of the second compression procedure is substantially equal to 1.

61. The power saving method of claim 59, wherein the second compression ratio of the second compression procedure is unequal to 1 and lower than the first compression ratio of the first compression procedure.

62. The power saving method of claim 54, further comprising performing a format conversion procedure to convert the image data in a first data format received from the storage unit into a second data format or convert the image data in the second data format received from the storage unit into the first data format, and store the converted image data in the storage unit.

63. A power saving method for a display device comprising:

performing a first signal processing procedure, wherein the first signal processing procedure comprises:

performing a first compression procedure on image data to generate compression data;

storing the compression data in a storage unit; and performing a first de-compression procedure on the compression data to recover the image data;

performing a second signal processing procedure when the first signal processing procedure is not performed, wherein the second signal processing procedure comprises:

processing the image data for storing in the storage unit without performing the first compression procedure; and processing the image data received from the storage unit for transmitting to a display unit without performing the first de-compression procedure; and performing the first signal processing procedure in a first operation mode and performing the second signal processing procedure in a second operation mode, wherein the first operation mode and the second operation mode indicate a first data quantity of the image data and a second data quantity of the image data, respectively, wherein the second data quantity is less than the first data quantity.

* * * * *